US011910283B2

(12) United States Patent
Vassilovski et al.

(10) Patent No.: US 11,910,283 B2
(45) Date of Patent: Feb. 20, 2024

(54) WIRELESS IN-VEHICLE NETWORKING ENHANCED INTERFERENCE DETECTION VIA EXTERNAL SENSORS

(71) Applicant: QUALCOMM Incorporated, San Diego, CA (US)

(72) Inventors: Dan Vassilovski, Del Mar, CA (US); Hong Cheng, Basking Ridge, NJ (US); Shailesh Patil, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

(21) Appl. No.: 16/997,810

(22) Filed: Aug. 19, 2020

(65) Prior Publication Data

US 2021/0227365 A1      Jul. 22, 2021

Related U.S. Application Data

(60) Provisional application No. 62/962,463, filed on Jan. 17, 2020.

(51) Int. Cl.
*H04W 4/46* (2018.01)
*B60W 30/08* (2012.01)
(Continued)

(52) U.S. Cl.
CPC ............ *H04W 4/46* (2018.02); *B60W 30/08* (2013.01); *H04W 52/44* (2013.01);
(Continued)

(58) Field of Classification Search
CPC ...................................................... H04W 4/46
See application file for complete search history.

(56) References Cited

U.S. PATENT DOCUMENTS 8,250,695 B2 * 8/2012 Karuppiah ............... B08B 1/04
15/88.2
10,491,312 B1 * 11/2019 Shimizu ............... H04B 1/3822
(Continued)

FOREIGN PATENT DOCUMENTS

WO      WO 2018182706 A1     10/2018

OTHER PUBLICATIONS

International Search Report and Written Opinion—PCT/US2020/063136—ISO/EPO—dated Mar. 12, 2021.

*Primary Examiner* — Joseph H Feild
*Assistant Examiner* — Pameshanand Mahase
(74) *Attorney, Agent, or Firm* — Weaver Austin Villeneuve & Sampson LLP/QUALCOMM

(57) ABSTRACT

Techniques described herein leverage existing localization sensors or V2X devices to detect one or more other vehicles that include wireless systems that can interfere with in-vehicle wireless networks. The localization sensors or V2X devices can provide information to determine a location, a heading, a speed, a size, and a type of other vehicles. This information can be used to determine a probability of network interference and allow the in-vehicle wireless networks to employ one or more techniques to mitigate the effects of the interference. The interference mitigation techniques can include increasing or decreasing transmitter power, changing a frequency or a channel of a wireless transmitter, or activating one or more additional transmitters as relays to improve reliability.

25 Claims, 8 Drawing Sheets

(51) Int. Cl.
   *H04W 52/44*      (2009.01)
   *H04W 72/541*     (2023.01)
   *H04L 67/12*      (2022.01)
   *H04W 4/48*       (2018.01)
   *H04W 72/02*      (2009.01)
   *H04W 72/0453*    (2023.01)
   *H04B 17/345*     (2015.01)
   *H04B 17/27*      (2015.01)
   *H04B 17/11*      (2015.01)
   *H04B 1/3822*     (2015.01)
   *H04B 17/21*      (2015.01)
   *H04W 64/00*      (2009.01)

(52) U.S. Cl.
   CPC . *B60W 2554/4041* (2020.02); *B60W 2556/65* (2020.02); *B60W 2710/30* (2013.01)

(56) References Cited

U.S. PATENT DOCUMENTS

| | | | |
|---|---|---|---|
| 2011/0028163 A1 | 2/2011 | Hoshihara et al. | |
| 2017/0367088 A1 | 12/2017 | Ruan et al. | |
| 2018/0199349 A1* | 7/2018 | Hehn | H04W 8/005 |
| 2019/0007795 A1* | 1/2019 | Kim | H04L 67/12 |
| 2020/0077279 A1* | 3/2020 | Foerster | H04W 16/28 |

* cited by examiner

WIRELESS IN-VEHICLE NETWORKING ENHANCED INTERFERENCE DETECTION VIA EXTERNAL SENSORS

CROSS-REFERENCES TO RELATED APPLICATIONS

This application claims priority to and incorporates by reference commonly-owned U.S. Patent Application Ser. No. 62/962,463, filed Jan. 17, 2020, entitled "Wireless In-Vehicle Networking Enhanced Interference Detection Via External Sensors," in its entirety and for all purposes.

BACKGROUND

There is increasing interest among Automobile manufacturers to replace existing in-vehicle wired networks (e.g., Controller Area Network (CAN), FlexRay, Local Interconnect Network (LIN), Media Oriented Systems Transport (MOST), Ethernet, etc.) with wireless networks. Introducing wireless networks to vehicles also requires detecting and managing wireless interference. Interference can cause intermittent malfunctioning of automotive systems, compromise system performance, and can be difficult to troubleshoot. Wireless interference sources may include wireless nodes within a vehicle, and wireless signals external to a vehicle, the latter including in-vehicle wireless networks from adjacent vehicles. Successfully detecting and managing external interference sources are a prerequisite for realizing effective, reliable in-vehicle wireless networks.

BRIEF SUMMARY

Techniques described herein provide for detecting and calculating the movement of potential interference sources for determining probability of wireless network interference. These techniques can draw on information provided by in-vehicle sensors and/or reception of Vehicle-to-everything (V2X) messages. The in-vehicle wireless networks can employ one or more mitigation strategies if the potential for interference exists.

Vehicles manufactured today include an array of sensors able to detect the presence of other vehicles. These sensors can include cameras, radar, LIDAR, and ultrasound. Using these sensors, a vehicle is able to determine static and dynamic characteristics of adjacent vehicles, including location, heading, speed, size, and type. Additionally, V2X-capable vehicles can broadcast their static and dynamic characteristics using industry-standard messages, such as Society of Automotive Engineers (SAE) Basic Safety Message (BSM), or European Telecommunications Standards Institute (ETSI) Intelligent Transport Systems (ITS) Cooperative Awareness Message (CAM).

By combining information from a vehicle's on-board sensors, and, if available, information from received V2X messages, a vehicle can determine the location of other vehicles relative to its location, and thus determine what part of the vehicle will be most affected by interfering signals from that vehicle. The algorithms used for detection of adjacent vehicles can be incorporated into the wireless network upper layer management.

These and other embodiments are described in detail below. For example, other embodiments are directed to systems, devices, and computer readable media associated with methods described herein. A better understanding of the nature and advantages of embodiments of the present disclosed may be gained with reference to the following detailed description and the accompanying drawings.

An example method of detecting and mitigating radio frequency (RF) interference at a first vehicle, according to this description, comprises detecting one or more vehicles within a threshold distance of the first vehicle, responsive to the detecting, determining a location and a motion state of the one or more vehicles, and determining potential RF interference of at least a portion of a wireless network of the first vehicle by the one or more vehicles based at least in part on the determined location and the determined motion state of the one or more vehicles. The method further comprises implementing an interference mitigation technique based at least in part on on the determined location and the determined motion state of the one or more vehicles.

An example device, according to this description, comprises a memory and one or more processing units communicatively coupled with the memory. The one or more processing units are configured to detect one or more vehicles within a threshold distance of a first vehicle, and, responsive to the detecting, determine a location and a motion state of the one or more vehicles. The one or more processing units are further configured to determine potential RF interference of at least a portion of a wireless network of the first vehicle by the one or more vehicles based at least in part on the determined location and the determined motion state of the one or more vehicles, and implement an interference mitigation technique based at least in part on on the determined location and the determined motion state of the one or more vehicles.

Another example device, according to this description, comprises means for detecting one or more vehicles within a threshold distance of a first vehicle, means for, responsive to the detecting, determining a location and a motion state of the one or more vehicles, and means for determining potential RF interference of at least a portion of a wireless network of the first vehicle by the one or more vehicles based at least in part on the determined location and the determined motion state of the one or more vehicles. The device further comprises means for implementing an interference mitigation technique based at least in part on on the determined location and the determined motion state of the one or more vehicles.

An example non-transitory computer-readable medium, according to this description, has instructions stored thereby which, when executed by one or more processing units, cause the processing units to perform functions including detecting one or more vehicles within a threshold distance of a first vehicle, responsive to the detecting, determining a location and a motion state of the one or more vehicles, and determining potential radio frequency (RF) interference of at least a portion of a wireless network of the first vehicle by the one or more vehicles based at least in part on the determined location and the determined motion state of the one or more vehicles. The instructions, when executed by the one or more processing units, further cause the processing units to perform functions including implementing an interference mitigation technique based at least in part on on the determined location and the determined motion state of the one or more vehicles.

Figure 1:
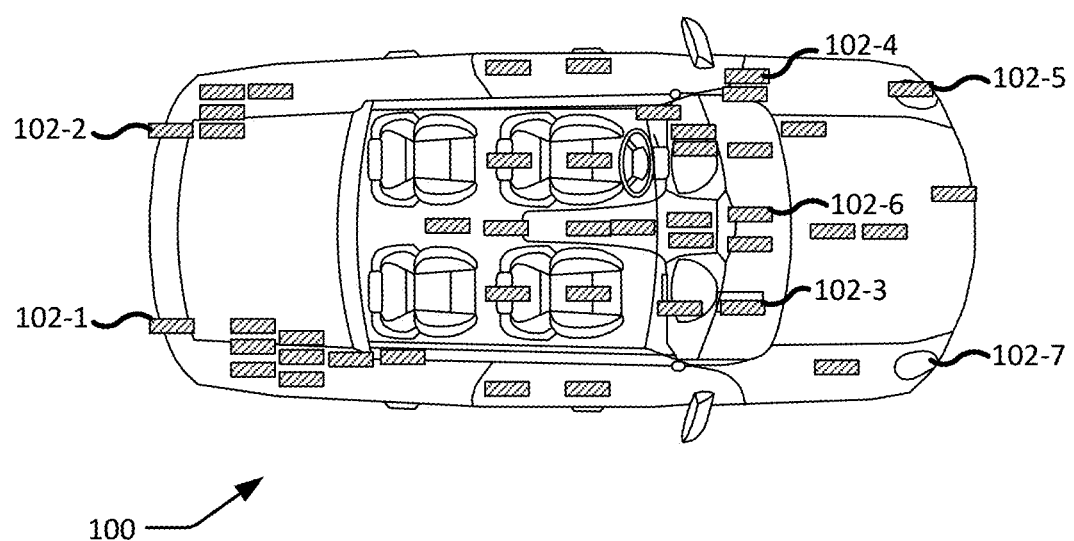
FIG. 1 illustrates a vehicle with a plurality of wireless transmitters.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly-termed road-side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE). V2X capabilities can be used for detection of other vehicles that can interfere with in-vehicle wireless networks.

As referred to herein, "V2X devices," "V2X-capable vehicles" (or simply "V2X vehicles"), and "V2X entities" respectively refer to devices, vehicles, and entities capable of transmitting and receiving V2X messages. Similarly, "non-V2X vehicles" and "non-V2X entities" refer to vehicles and entities that do not or cannot engage in V2X communications. Although many embodiments described "V2X vehicles" and "non-V2X vehicles," it will be understood that many embodiments can be expanded to include non-vehicle entities, such as pedestrians, cyclists, road hazards, obstructions, and/or other traffic-related objects etc. As generally referred to herein, the "objects" detected by sensors as described in the embodiments herein may refer to detected vehicles or non-vehicle objects, which may be on or near the road. Additionally, although embodiments herein are directed toward V2X enhanced navigation techniques, it will be understood that alternative embodiments may be directed toward alternative forms of traffic-related communication. A person of ordinary skill in the art will appreciate such variations.

In V2X communication, data transmitted by one V2X device may be relevant only to V2X devices within a certain distance of the transmitting V2X device. For example, vehicles attempting to traverse an intersection may only find data relevant within a certain proximity to the intersection. Similarly, for vehicles participating in coordinated driving, only vehicles affected by a maneuver may find the data relevant.

As noted, V2X (under 5G NR) supports distanced-based communication control. More specifically, if a receiving V2X device within a specified distance (referred to herein as the "V2X communication range" or simply "communication range") receives a V2X message from a transmitting V2X device, the receiving V2X device will transmit a negative acknowledgement (NAK) if it is within the specified range, but has failed to decode the message. This allows the transmitting V2X device to retransmit the message. Through this mechanism, the reception reliability of V2X is increased for V2X devices within the specified range, enhancing performance for device maneuvers relying on the underlying V2X communication.

Additionally, V2X-capable devices may be knowledgeable of the location and motion state of other V2X vehicles, as well as non-V2X vehicles (and other objects) in their vicinity. For the former, this may be determined by reception of message or signaling from other V2X devices, for example, control signaling indicating V2X device's or vehicle's location, BSM or CAM. For the latter, this may be determined by on-board sensors capable of detecting the motion state and/or other properties of the non-V2X vehicles and other objects.

Embodiments provided herein leverage existing localization sensors or V2X devices to detect one or more other vehicles that include wireless systems that can interfere with in-vehicle wireless networks. The localization sensors or V2X devices can provide information to determine a location, a heading, a speed, a size, and a type of other vehicles. This information can be used to determine a probability of network interference and allow the in-vehicle wireless networks to employ one or more techniques to mitigate the effects of the interference. This a-priori knowledge of a potential interference, such as detection of an oncoming vehicle, enables pro-active mitigation steps.

FIG. 1 illustrates a vehicle 100 with a plurality of wireless transmitters 102, according to an embodiment. A vehicle 100 can have numerous sensors distributed throughout the vehicle 100. These sensors can include but are not limited to collision impact sensors to deploy the vehicle's airbags, moisture sensors to activate the windshield wipers, light sensors to automatically activate the vehicle lights, and tire pressure-monitoring sensors. Currently many of sensors have wired connections to send messages to the vehicle's dashboard or computer system. There is increasingly strong interest among automobile manufacturers to replace existing in-vehicle wired networks (e.g., Controller Area Network (CAN), FlexRay, Local Interconnect Network (LIN), Media Oriented Systems Transport (MOST), Ethernet, etc.) with wireless networks. For example, wireless transmitters 102-1 through 102-7 are distributed throughout the vehicle 100.

These wireless transmitters can be susceptible to radio frequency (RF) interference from other RF transmissions that can originate from other vehicles. Depending on transmitter location, the wireless transmitters can be affected by external sensors. For example, sensors in the rear of the vehicle (e.g., sensors 102-1 and 102-2) can be affected by external sources (e.g., other vehicles) behind the vehicle. The distribution of wireless transmitters (102-1 to 102-7) shown in FIG. 1 is provided as an example. Sensor locations may vary depending on vehicle type, employed technologies, and/or other factors.

Figure 2:
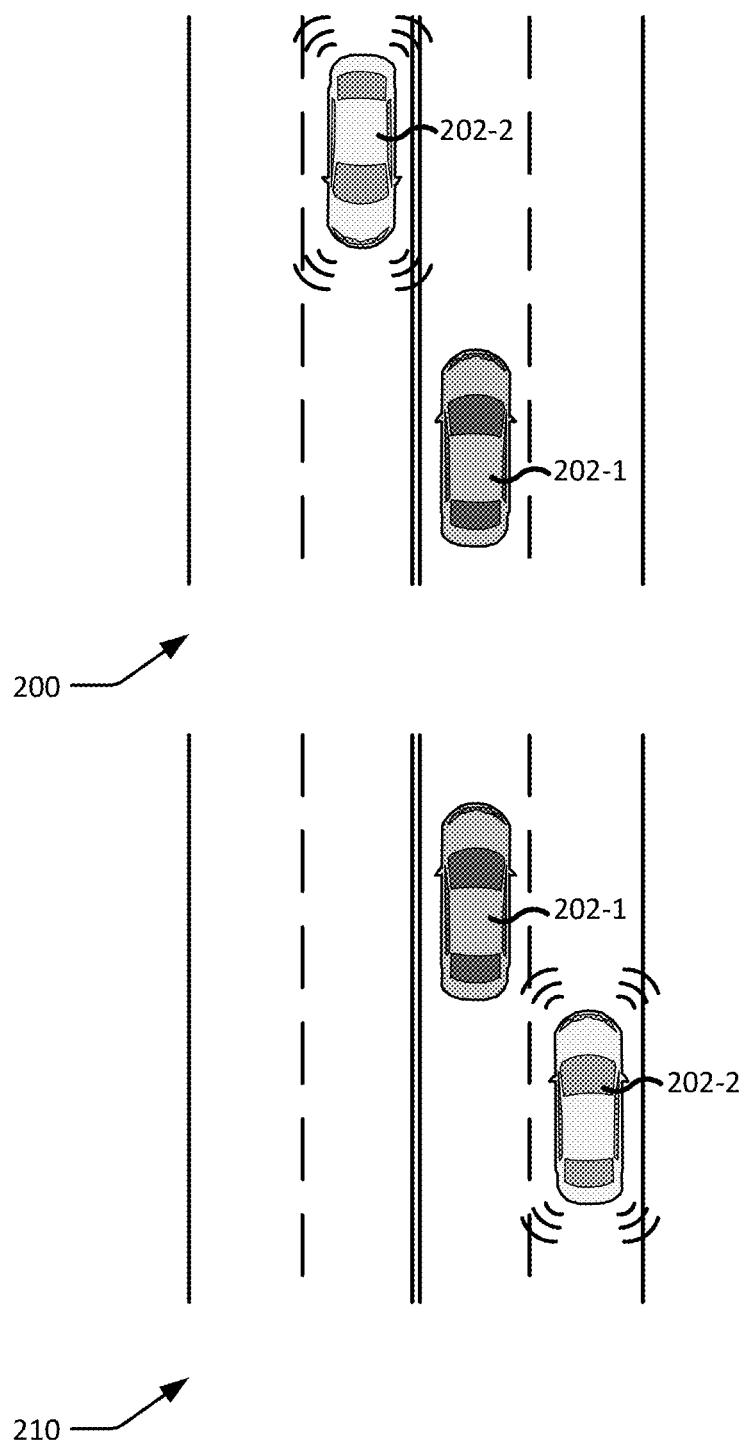
FIG. 2 illustrates exemplary encounters for possible interference for wireless sensors.

FIG. 2 illustrates exemplary encounters 200, 210 for possible interference for wireless sensors between vehicles. FIG. 2 illustrates two vehicles 202 in close vicinity on a divided roadway. A first vehicle 202-1 can include a plurality of wireless transmitters, and a second vehicle 202-2 can also include wireless transmitters that can operate in the same RF band as the wireless transmitters in the first vehicle 202-1.

In a first exemplary encounter 200, the two vehicles are traveling in opposite directions and the wireless sensors on the first vehicle 202-1 may be initially subject to interference on the front-driver side from transmissions from the second vehicle 202-2. In the first encounter 200, the interference may travel from the front diver-side of the second vehicle 202-2 to the rear driver-side. The intensity of the interference can be affected by the distance between the first vehicle 202-1 and the second vehicle 202-2.

In a second exemplary encounter 210, the first vehicle 202-1 and the second vehicle 202-2 are travelling in the same direction. Here, the wireless sensors on the first vehicle 202-1 may be subject to interference on the passenger side rear from transmissions from the second vehicle 202-2. In the second encounter, the interference may travel from the passenger side rear of the first vehicle 202-1 to the front passenger side, if the second vehicle 202-2 passes the first vehicle 202-1. Again, the intensity of the interference can be affected by the distance between the first vehicle 202-1 and the second vehicle 202-2.

Figure 3:
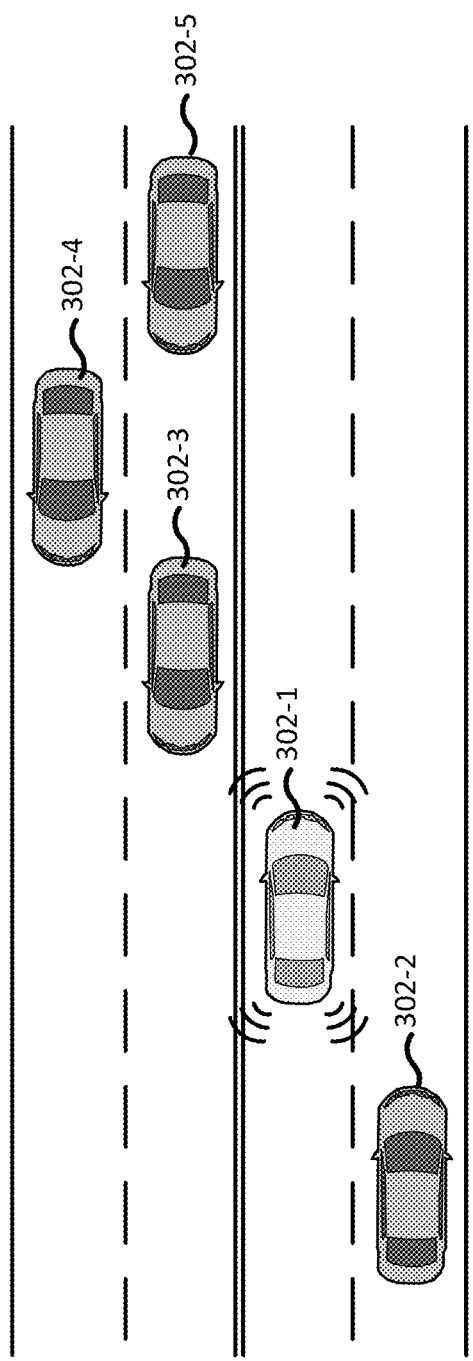
FIG. 3 illustrates an exemplary technique of using existing on-board sensors to determine a location and motion state of other vehicles.

FIG. 3 illustrates an exemplary technique of using existing on-board sensors to determine a location and motion state of other vehicles. Modern vehicles can include a plurality of on-board sensors (e.g., camera, LIDAR, radar, ultra-sound). In some embodiments, a front camera can be installed on the top center of the windshield. In some embodiments, radar sensors can be located in the front and rear corners of the vehicle. In some embodiments, side mounted cameras can be installed on the side-doors of vehicles.

In various embodiments, these on-board sensors can be used for various automated driving features (e.g., emergency braking features, adaptive cruise control, lane centering). These on-board sensors in a first vehicle 302-1 can be used to detect a distance and an aspect of one or more vehicles in a vicinity of the first vehicle 302-1. In FIG. 3, the first vehicle 302-1 can use these on-board sensors to determine a location and/or motion state of a second vehicle 302-2 a third vehicle 302-3. In various embodiments, the on-board sensors can determine a location and/or motion state of vehicles farther away, such a fourth vehicle 302-4 and a fifth vehicle 302-5.

The location of vehicles 302-2, 302-3, 302-4, and/or 302-5 can be determined by the first vehicle 302-1, for example, by obtaining a distance and an angular measurement returned signals from transmitted signals from that reflect off of vehicles. Active sensors that transmit signals and can obtain distance and/or angular measurements from such returned signals include, for example, LIDAR, radar, and ultra-sound sensors. Distance can be determined, for example, by measuring the time difference between transmitting a signal (e.g., light, electromagnetic, and sound) and receiving the return signal. The propagation speed of the transmitted signal is a known quantity. Therefore, the distance can be calculated by multiplying the propagation speed of the signal by the travel time.

Additionally or alternatively, an angular measurement of vehicles 302-2, 302-3, 302-4, and/or 302-5 can be determined, for example, by the location of a sensor on the first vehicle 302-1 that receives the return signals (e.g., light, electromagnetic, radar, and sound, which also may be used for distance determination as previously described). For instance, an angle or direction of the third vehicle 302-3 relative to the first vehicle 302-1 can be determined if the signal is received by a sensor on the driver's side of the first vehicle 302-1. Using a first distance calculated by the round-trip time from the first vehicle 302-1 and the third vehicle 302-3, as well as the location of the sensor (e.g., driver's side front) on the first vehicle 302-1, the first vehicle 302-1 can determine a location of the third vehicle 302-3. The determined location of the third vehicle 302-3 may be relative to the first vehicle 302-1. Additionally or alternatively, the determined location may be absolute and/or relative to another object, area, or region (which may be determined based on a known absolute/relative location of the first vehicle 302-1).

In some embodiments, a return signal received by the first vehicle 302-1 from a reflection of a transmitted signal off of the third vehicle 302-3 may be Doppler shifted due to the motion of the third vehicle 302-3 relative to the first vehicle 302-1. That is, the returned signal may have a higher or lower frequency than the corresponding transmitted signal. For example, a sensor that receives a returned signal that experiences a Doppler shift to a higher frequency indicates the object (off of which the signal reflected) is moving toward the sensor, whereas a Doppler shift to a lower frequency) indicates the object is moving away from the sensor. The amount of shift can indicate the relative speed of the movement. The Doppler shift and a known heading information for the first vehicle 302-1 can be used to determine the heading of the one or more other vehicles. In this manner, according to some embodiments, the first vehicle 302-1 may determine a motion state (e.g., velocity and/or heading) of one or more nearby vehicles 302-2, 302-3, 302-4, and/or 302-5.

In addition or as an alternative to active sensors that transmit signals and measure returned signals, the first vehicle 302-1 may use one or more passive sensors (which do not transmit signals) to determine location and/or speed of other vehicles. For example, using image processing to implement object detection, a camera at a fixed location on the first vehicle 302-1 may identify an object within the camera's field of view and determine the object's location based on the area within the camera's field of view (e.g., pixels of the camera's sensor) in which the object is detected. Moreover, according to some embodiments, tracking techniques may be used to track the object from one camera image to another (e.g., between frames of video), to determine the object's speed and/or heading.

Figure 4:
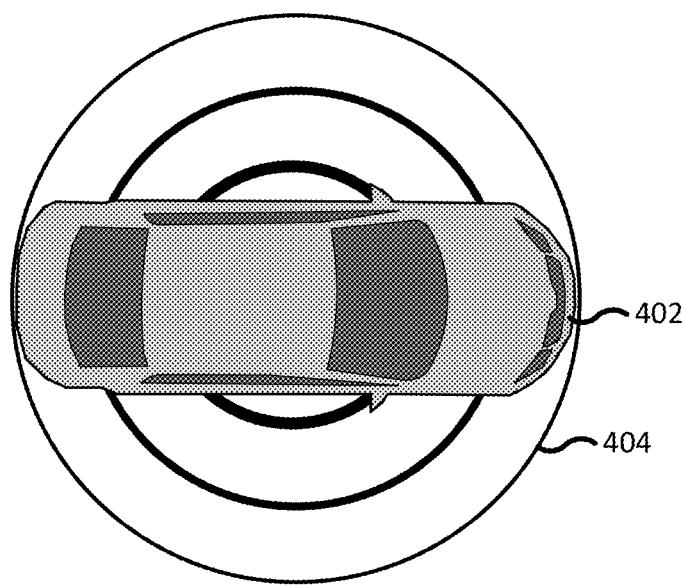
FIG. 4 illustrates an exemplary V2X vehicle.

FIG. 4 is an illustration of an embodiment of a V2X vehicle 402. A V2X vehicle 402 can broadcast one or more messages using RF signals 404. The messages, which can include static and dynamic information of the V2X vehicle (along with other information), may be broadcast at regular intervals. The V2X vehicle 402 can broadcast using application-layer messages defined by SAE, ETS-ITS, C-SAE/

C-ITS. The broadcast information messages can include V2X vehicle 402 location, vehicle heading, and vehicle speed.

In some embodiments, messages sent by the V2X vehicle 402 may include a BSM. A BSM can include a packet of data that contains information about vehicle position, heading, speed, and other information relating to a vehicle's state and predicted path. In various embodiments, the BSM may contain no personally identifying information (PII) but may identify the type and model of the vehicles. In this way, a receiving V2X vehicle 402 can determine the wireless network configuration on the vehicle.

In some embodiments, messages sent by the V2X vehicle 402 may include a CAM. A CAM is broadcast as part of the ETSI standards, and, similar to a BSM, may contain information about the V2X vehicle 402 like vehicle type, position, heading, speed, and acceleration. A V2X vehicle 402 may send CAMs on a regular basis. The receiving entity of such messages interprets them and creates a so-called local dynamic map (LDM). The LDM is an environment database maintained in and by each vehicle and supports various applications.

In some embodiments, a V2X device and be an electronic device (e.g., a smartphone) deployed with a V2X chipset to provide motion information and driving intention to assist strategy settings of the edge network devices. As such, embodiments of a V2X vehicle 402 may comprise a vehicle with such a V2X device located therein or thereon. Smartphones with V2X chipsets can access motion and sensor data of an associated vehicle through wired or wireless connection. If there is no direct connection to the vehicle, smartphones with sensors and GPS can provide information such as location, speed, acceleration for calculations of recommended route, recommended speed, and recommended lane.

With a direct wireless connection (e.g., PC5 or similar), the V2X vehicle 402 can periodically broadcast its motion state directly to all V2X devices (including edge network devices and other vehicles within message coverage areas) in real time or near real time. Additionally or alternatively, network-based connections (e.g., Uu connections) can enable the V2X vehicle 402 to transmit vehicle information to associated edge network devices. In addition to motion state and/or vehicle information (e.g., in a BSM or CAM), the V2X vehicle 402 may send intention information, such as driving destination, desired directions, or lane change intentions.

According to some embodiments, the V2X vehicle 402 may send information indicative of properties of a detected vehicle in a V2X message. These properties may vary, depending on the type of sensors used to detect the detected vehicle. These properties may generally include information regarding the detected vehicle's location and motion state, which may be determined in the manner previously described. More specifically, properties can include the detected vehicle's absolute and/or relative location (e.g., relative to the transmitting vehicle, intersection, etc.), velocity (or speed and/or direction components separately), acceleration, and the like. In some embodiments, other detected properties may include vehicle type, one or more detected visible features, and the like.

Figure 5:
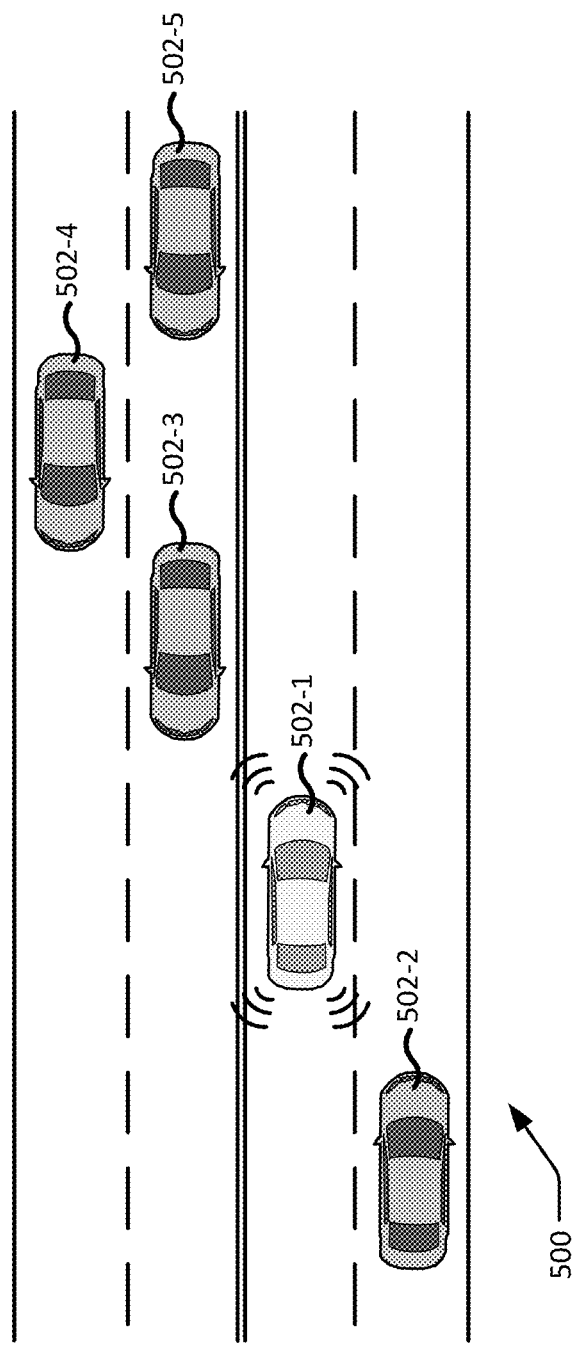
FIG. 5 illustrates a roadway segment with a plurality of V2X vehicles.

FIG. 5 illustrates a roadway segment 500 with a plurality of vehicles 502-1 through 502-5 (collectively and generically referred to herein as vehicles 502), according to an example. In this example, each vehicle 502 comprises a V2X vehicle that can transmit and receive V2X messages in the manner previously described. Each V2X message can include the location and motion state of adjacent vehicles. For example, in FIG. 5, a first vehicle 502-1 can receive V2X messages sent from a second vehicle 502-2, a third vehicle 502-3, a fourth vehicle 502-4, and a fifth vehicle 502-5, where each message includes a location and motion state of the vehicle 502 sending the message. Although five vehicles are depicted in the example of FIG. 5, different situations may include any number of vehicles. Further, the messages from the V2X vehicles 502-2 through 502-5 can augment information received from on-board sensors as previously discussed with regard to FIG. 3. In addition to motion state and location, the V2X messages can contain information regarding the type, model, and configuration of the nearby vehicles. In this way, the first vehicle 502-1 can more easily determine if there is a probability of wireless network interference to take proactive measures.

According to embodiments herein, if the first vehicle 502-1 determines a possibility of wireless network interference based on the V2X messages and/or sensor information it receives, the first vehicle 502-1 can implement one or more interference mitigation measures. Interference mitigation techniques can include, for example, increasing or decreasing a power of a wireless transmitter of the wireless network, changing a frequency or a channel of a wireless transmitter of the wireless network, increasing or decreasing a gain level of a wireless receiver of the wireless network, and/or activating one or more additional wireless transmitters as relays to improve reliability of the wireless network. Additional or alternative interference mitigation techniques can include vehicle movement, such as changing lanes, speed, route, and/or spacing between vehicles. Each interference mitigation technique can be based on detection of a source of wireless interference. A-priori knowledge of a potential interferer, such as detection of an oncoming vehicle, enables pro-active mitigation steps. The system can also note and adjust a recorded reliability of particular sensors based on the wireless network interference. In this way the reliability can be used for subsequent vehicle designs, sensor selection, or mitigation strategies armed with the knowledge of potential sources of interference.

Figure 6:
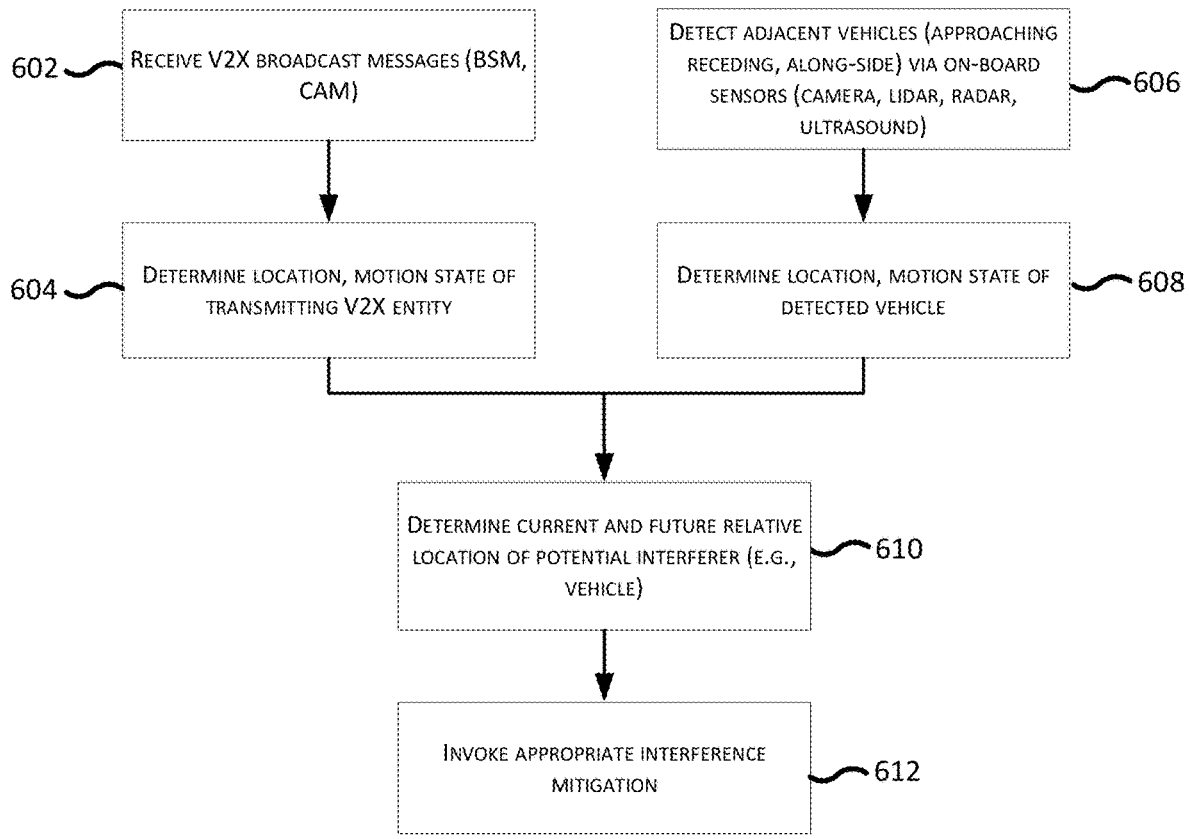
FIG. 6 is a flow diagram of a method for detecting wireless network interference, according to embodiment.
Figure 8:
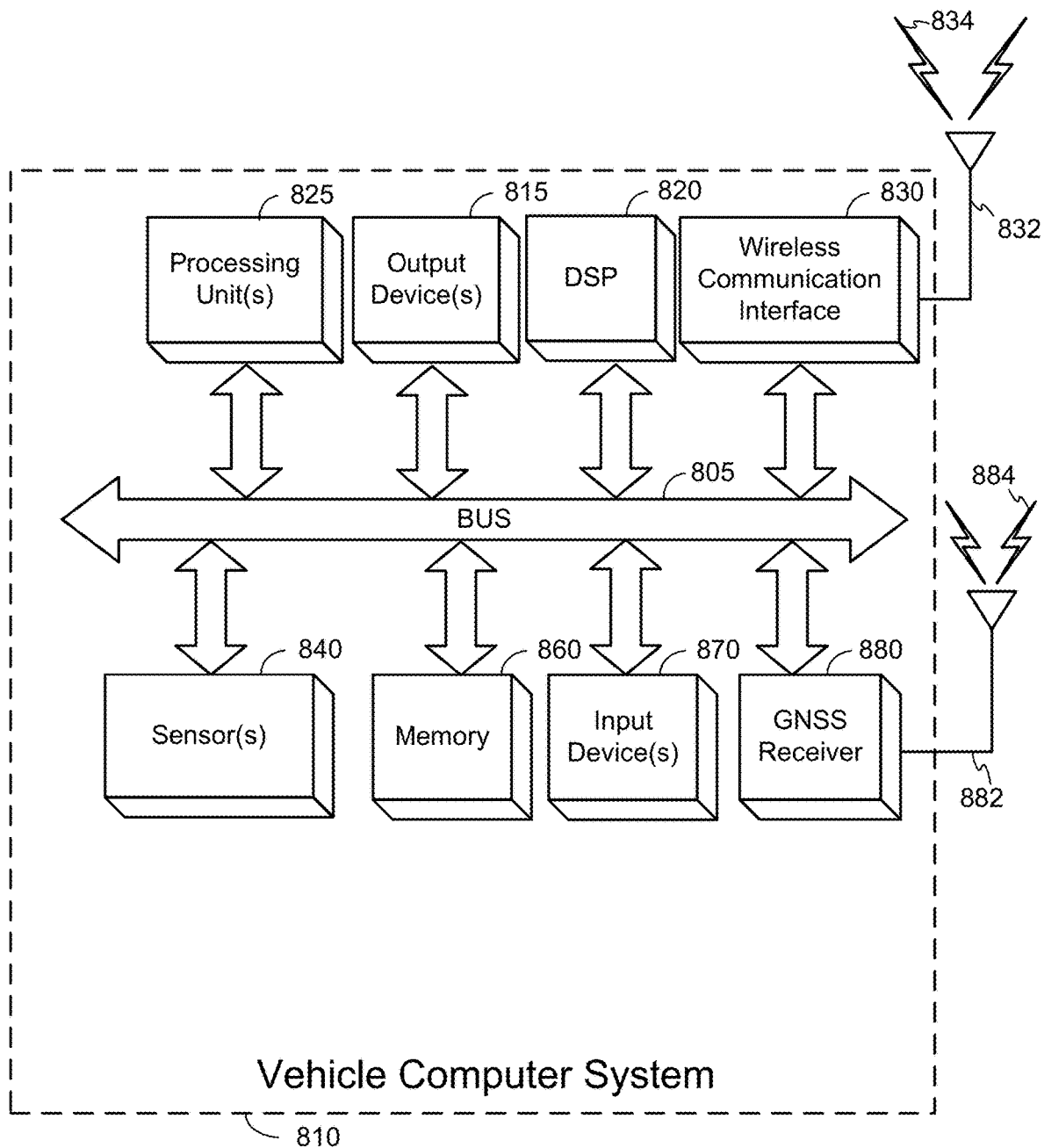
FIG. 8 is a block diagram of an embodiment of a V2X device.

FIG. 6 is a flow diagram of a method 600 for detecting and mitigating wireless network interference, according to embodiment. Alternative embodiments may vary in function by combining, separating, or otherwise varying the functionality described in the blocks illustrated in FIG. 6. Means for performing the functionality of one or more of the blocks illustrated in FIG. 6 may comprise hardware and/or software components of a V2X vehicle, or more broadly, a V2X device. An example V2X device is illustrated in FIG. 8 and described below.

At block 602, the method 600 can include receiving V2X broadcast messages (e.g., BSM, CAM). The V2X broadcast messages may be received periodically, in the periodicity of which may depend on vehicle capabilities, governing standards, and/or other related factors. The V2X message can be transmitted via wireless means using applicable RF frequencies. In some embodiments, for example, V2X messages are broadcast using a 5.9 GHz frequency band. Other embodiments may use additional or alternative frequency bands. A V2X message broadcast from a transmitting vehicle can be wirelessly received (e.g., via a receiver or transceiver) by multiple V2X vehicles within broadcast range of the transmitting vehicle.

At block 604, the method 600 can include using the V2X broadcast messages to determine a location and motion state of the transmitting V2X entities. In various embodiments, the V2X broadcast messages can information that can include one or more of a location of the one or more vehicles, a speed of the one or more vehicles, a heading of the one or more vehicles, an identification of the one or more vehicles, a type and model of the one or more vehicles, and a wireless network configuration of the one or more vehicles. The location of the one or more vehicles can be provided by a vehicle's navigation sensors (e.g., GNSS sensors). In some embodiments, the location of the one more vehicles can be determined by User Equipment (UE) assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), Enhanced Cell Identity (ECID), angle of arrival (AOA), angle of departure (AOD), Wireless Local Area Network (WLAN) positioning, and/or other positioning procedures and methods. Network based positioning procedures and methods may include the use of a wireless network comprising a mobile communication network (e.g. LTE or NR), WLAN, Bluetooth network, and/or other wireless networks. In some embodiments, the speed of the one or more vehicles can be determined by a sensor in the vehicle (e.g., a speedometer or an accelerometer). In some embodiments, the speed can be determined by a vehicle's navigation sensors (e.g., GNSS sensors).

At block 606, for non-V2X vehicles, the method 600 can include detecting adjacent vehicles (approaching receding, alongside) via on-board sensors (e.g., camera, LIDAR, radar, ultrasound). In various embodiments, the on-board sensors can include active sensors (e.g., LIDAR, radar, and ultrasound) that transmit a signal from the non-V2X vehicle that reflects off the one or more adjacent vehicles and is received by the receiver of the non-V2X vehicle. As noted, the round-trip time of the active signal can be used to calculate a distance to the one or more adjacent vehicles. The frequency shift of the active signal can be used to calculate a relative velocity of the one or more adjacent vehicles. Non-active sensors, such as cameras, may be used to measure speed, heading, and/or location in the manner previously described.

At block 608, the method 600 can include determining a location and a motion state of one or more detected vehicles. In various embodiments, the location can include a range and angle. In various embodiments, the location can include an absolute or relative position. In various embodiments, the motion state can include a velocity of the one or more detected vehicles. The velocity can include a speed and a direction. The location of the one or more vehicles can be provided by a vehicle's navigation sensors (e.g., GNSS sensors). In some embodiments, the location of the one or more vehicles can be determined by multiangulation and/or multilateration of one or more transmission signals in a network. In some embodiments, the speed of the one or more vehicles can be determined by a sensor in the vehicle (e.g., a speedometer or an accelerometer). In some embodiments, the speed can be determined by a vehicle's navigation sensors (e.g., GNSS sensors).

At 610, the method 600 can include determining current and future relative location of potential interferer (e.g., vehicle). In various embodiments, the determining a future relative location of the potential interferer can include interpolating the motion state from the present location of the vehicle. Using the location and motion state of the detected vehicle and the location of motion state of the subject vehicle (V2X or non-V2X vehicle) can be used to determine current relative location of a potential interferer. In various embodiments, the location and motion state information can extrapolate future positions of both the detected vehicle and the subject vehicle. In some embodiments, the functionality at block 610 can include determining if the distance and angular relations between the detected vehicle and the subject vehicle are within predetermined thresholds.

At block 612, the method 600 can include invoking one or more appropriate interference mitigation techniques. As noted, interference mitigation techniques can include, for example, increasing or decreasing a power of a wireless transmitter of the wireless network, changing a frequency or a channel of a wireless transmitter of the wireless network, increasing or decreasing a gain level of a wireless receiver of the wireless network, and/or activating one or more additional wireless transmitters as relays to improve reliability of the wireless network. Additional or alternative interference mitigation techniques can include vehicle movement, such as changing lanes, speed, route, and/or spacing between vehicles.

It should be appreciated that the functions illustrated in FIG. 6 provide for the detection and mitigation of wireless network signals according to various embodiments of the present disclosure. Other sequences of steps may also be performed according to alternative embodiments. For example, alternative embodiments of the present disclosure may perform the steps outlined above in a different order and/or otherwise rearranged. In some embodiments, such as for non-V2X vehicles, the functions at blocks 602 and 604 may be omitted. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
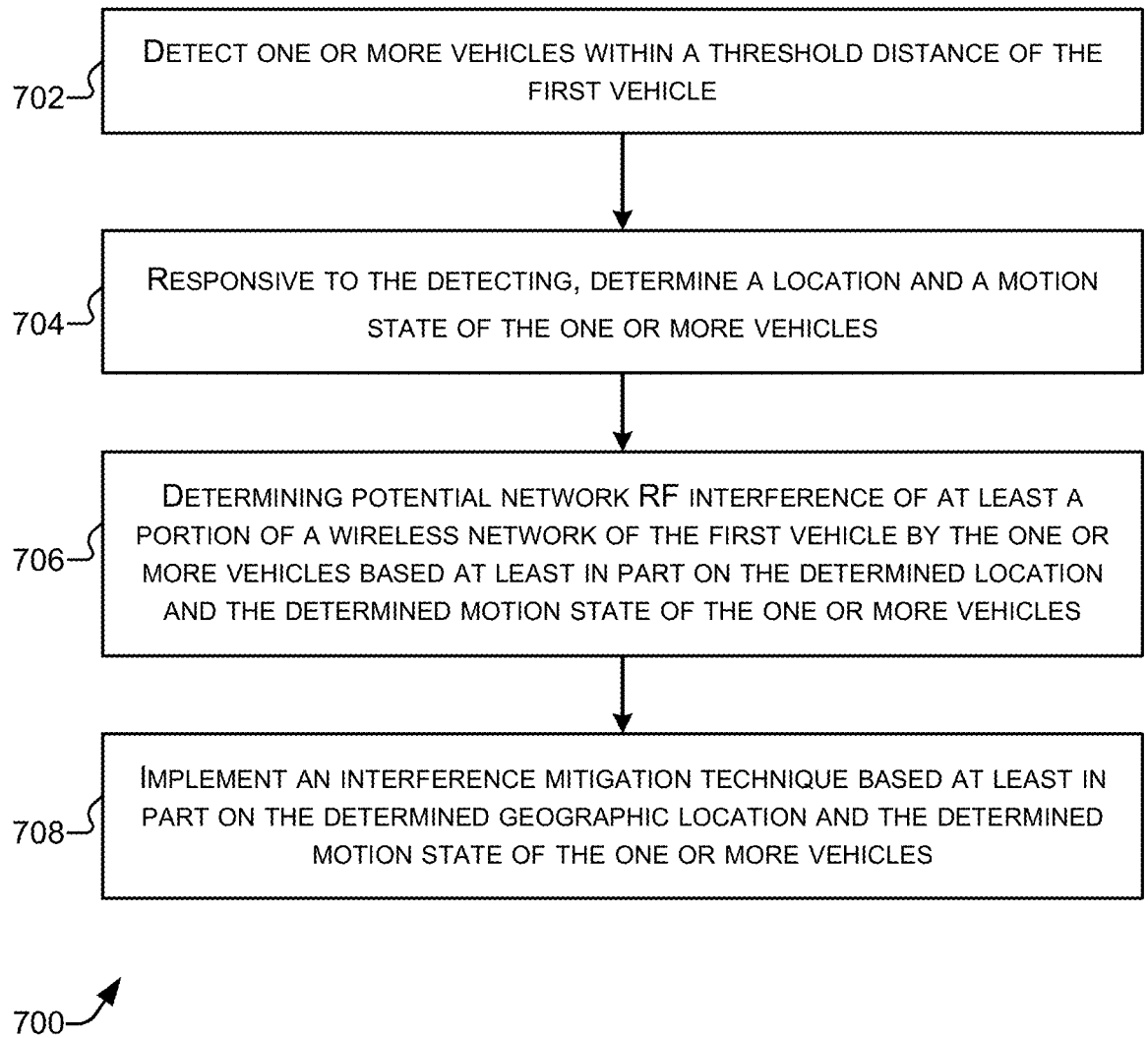
FIG. 7 is a flow diagram of a method for detecting wireless network interference, according to embodiment.

FIG. 7 is a flow diagram of a method 700 for detecting and mitigating RF interference at a first vehicle, according to embodiment. Alternative embodiments may vary in function by combining, separating, or otherwise varying the functionality described in the blocks illustrated in FIG. 7. Means for performing the functionality of one or more of the blocks illustrated in FIG. 7 may comprise hardware and/or software components of a vehicle computer system, such as the vehicle computer system 810 illustrated in FIG. 8 and described below.

At block 702, the method 700 includes detecting one or more vehicles within a threshold distance of the first vehicle. In various embodiments, detecting one or more vehicles within a threshold distance of the first vehicle can include determining a distance between the first vehicle and the one or more vehicles. As previously discussed, this determination may comprise receiving one or more return signals from a sensor of the first vehicle (e.g., an active sensor such as radar, LIDAR, or an ultrasound sensor), calculating a distance based on the one or more return signals (e.g., based on a round-trip time determination), and comparing the distance to a threshold distance. According to some embodiments, detecting the one or more vehicles within a threshold distance of the first vehicle may comprise receiving one or more return signals from a sensor of the first vehicle, determining a distance of the one or more vehicles based on the one or more return signals, and determining the distance is less than the threshold distance.

In some embodiments, the threshold distance may vary, depending on velocity (speed and direction) of the one or more vehicles. For example, a threshold distance for triggering an interference mitigation technique may be farther away if a detected vehicle is rapidly approaching the first vehicle than if a detected vehicle is slowly approaching the first vehicle. For detected vehicles moving away from the first vehicle, the threshold distance for triggering an interference mitigation technique may be far smaller (e.g., only triggering if the vehicle is within a short range from the first vehicle). Thus, in some embodiments of the method 700, detecting the one or more vehicles within the threshold distance may comprise determining a velocity and direction of the one or more vehicles.

According to some embodiments, the threshold distance may be based on additional or alternative factors. The first vehicle may be more vulnerable to interference in some proximate locations than others (e.g., more vulnerable on the driver side than the passenger side). Thus, one factor that may influence the threshold distance may comprise an angle at which the first vehicle detects the one or more vehicles. Different vehicle types and models may cause different levels of interference. And thus, in some embodiments, a factor that may influence the threshold distance may comprise a type and model of the one or more vehicles. Another factor may comprise the type of wireless network of the first vehicle, which may determine how vulnerable the wireless network is to interference.

As noted in the previously discussed embodiments, embodiments may employ V2X functionality to determine whether one or more vehicles are within a threshold distance, and/or obtain additional information regarding the one or more vehicles. Thus, in some embodiments of the method 700, the detecting the one or more vehicles proximate to the first vehicle comprises receiving one or more V2X broadcast messages from the one or more vehicles. Means for performing the functionality of block 702 can include, for example, wireless communication interface 830, processing unit(s) 825, DSP 820, sensor(s) 840, and/or other components of a vehicle computer system 810 as illustrated in FIG. 8 and described below.

At block 704, the method 700 includes determining a location and a motion state of the one or more vehicles. In some embodiments, this may comprise determining a relative angle of the one or more vehicles from the first vehicle and/or relative velocity between the one or more vehicles and the first vehicle. In embodiments in which V2X messages are used, determining the location and the motion state of the one or more vehicles may comprise receiving one or more V2X messages from the one or more vehicles, and determining, from the one or more V2X messages, a location, a heading, and a speed of the one or more vehicles. Means for performing the functionality of block 704 can include, for example, wireless communication interface 830, processing unit(s) 825, DSP 820, and/or other components of a vehicle computer system 810 as illustrated in FIG. 8 and described below.

At block 706, the method 700 includes determining potential RF interference of at least a portion of a wireless network of the first vehicle by the one or more vehicles based at least in part on the determined location and the determined motion state of the one or more vehicles. In some embodiments, this may include determining a time of potential interference based at least in part on the location, the heading, and the speed of the one or more vehicles. Additionally or alternatively, determining the potential RF interference of the at least a portion of the wireless network of the first vehicle may comprise determining a portion of the wireless network vulnerable to the potential RF interference based at least in part on the location, heading, and the speed of the one or more vehicles. This determination may comprise identifying regions and/or components on the first vehicle exposed to interference by RF signals from the one or more vehicles. Means for performing the functionality of block 706 can include, for example, processing unit(s) 825, DSP 820, and/or other components of a vehicle computer system 810 as illustrated in FIG. 8 and described below.

At block 708, the method 700 includes, implementing an interference mitigation technique based at least in part on the determined location and the determined motion state of the one or more vehicles. Means for performing the functionality of block 706 can include, for example, processing unit(s) 825, DSP 820, and/or other components of a vehicle computer system 810 as illustrated in FIG. 8 and described below.

As noted in the previously described embodiments, interference mitigation techniques may vary, depending on desired functionality. Such techniques can include, for example, increasing or decreasing a power of a wireless transmitter of the wireless network, changing a frequency or a channel of a wireless transmitter of the wireless network, increasing or decreasing a gain level of a wireless receiver of the wireless network, activating one or more additional wireless transmitters of the wireless network, and/or any combination thereof. Increasing or decreasing a power of a wireless transmitter can, for example, adjust Signal-To-Noise Ratio (SNR) levels within the wireless network to suitable ranges to help ensure reliable wireless communication despite the potential interference. Increasing or decreasing a gain level may have a similar effect, but at the receiver side of a wireless link. Changing a frequency or channel of a wireless transmitter can help reduce interference where a frequency or channel of the potential RF interference is known or can be predicted (e.g., is detected by one or more components of the first vehicle and/or determined based on vehicle type, model, and/or other factors). Activating one or more additional wireless transmitters of the wireless network may help boost signal strength within the wireless network, which again can help ensure the reliability of communications within the wireless network.

It should be appreciated that the specific steps illustrated in FIG. 7 provide particular techniques for detecting and mitigation wireless network signals according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

FIG. 8 is a block diagram of an embodiment of a vehicle computer system 810, which may be utilized as described herein above. In some embodiments, the vehicle computer system 810 may comprise or be integrated into one or more additional vehicular systems, such as those related to the vehicle's navigation and/or automated driving. As such, components shown may be capable of communicating with other onboard systems and/or other traffic entities (not shown). In some embodiments, the vehicle computer system 810 may comprise a stand-alone device or component on a vehicle, which may be communicatively coupled with other components/devices of the vehicle (or entity). In some embodiments, the vehicle computer system 810 may comprise a V2X device and/or may be otherwise capable of allowing a vehicle to engage in V2X communications and functionality.

As noted, the vehicle computer system 810 may implement an application layer and radio layer and may perform one or more of the functions of method 700 of FIG. 7. For example, the application layer may be executed by the processing unit(s) 825, and the radio layer may be executed by the wireless communication interface 830. In alternative embodiments, the application layer and/or radio layer may be implemented by additional or alternative components. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be located, for example, at different physical locations on a vehicle. As noted with regard to FIG. 1, a wireless network of a vehicle may comprise sensors and/or other wireless components located on the vehicle. According to some embodiments, the vehicle computer system 810 may communicate with the wireless network via the wireless communication interface 830.

The vehicle computer system 810 is shown comprising hardware elements that can be electrically coupled via a bus 805 or may otherwise be in communication, as appropriate. In some embodiments, one or more of the components illustrated in the vehicle computer system 810 may be wirelessly connected (and therefore may be part of a wireless network of a vehicle, as described in embodiments herein). The hardware elements may include a processing unit(s) 825 which can include without limitation one or more general-purpose processors, one or more special-purpose processors (such as digital signal processing (DSP) chips, graphics acceleration processors, application-specific integrated circuits (ASICs), and/or the like), and/or other processing structure or means. As shown in FIG. 8, some embodiments may have a separate Digital Signal Processor (DSP) 820, depending on desired functionality. In embodiments where a sensor-processing unit 840 is integrated into the vehicle computer system 810, the processing unit(s) 825 may comprise the sensor-processing unit 840.

The vehicle computer system 810 also can include one or more input devices 870, which can include devices related to user interface (e.g., a touch screen, touchpad, microphone, button(s), dial(s), switch(es), and/or the like) and/or devices related to navigation, automated driving, and the like. Similarly, the one or more output devices 815 may be related to interacting with a user (e.g., via a display, light emitting diode(s) (LED(s)), speaker(s), etc.), and/or devices related to navigation, automated driving, and the like.

The vehicle computer system 810 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. The wireless communication interface 830 can enable the vehicle computer system 810 to communicate to other devices, including V2X devices (in some embodiments), remote from the vehicle. As previously noted, additionally or alternatively may be used to communicate with a wireless network of the vehicle. Communication using the wireless communication interface 830 can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof.

Depending on desired functionality, the wireless communication interface 830 may comprise a separate receiver and transmitter, or any combination of transceivers, transmitters, and/or receivers to communicate with base stations of a mobile carrier network and/or other terrestrial transceivers, such as wireless devices and access points. The wireless communication interface 830 may allow the vehicle to communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies such as CDMA2000, Wideband Code Division Multiple Access (WCDMA), and so on. CDMA2000 includes IS-95, IS-2000 and/or IS-856 standards. A TDMA network may implement Global System for Mobile Communications (GSM), Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network.

The vehicle computer system 810 can further include sensor(s) 840. Sensors 840 may comprise, without limitation, one or more accelerometers, gyroscopes, cameras, magnetometers, altimeters, microphones, proximity sensors, light sensors, barometers, radar, lidar, ultrasonic sensors, and the like. As previously noted, sensor(s) 840 may be used to determine certain real-time characteristics of the vehicle, such as location, velocity, acceleration, and the like. Additionally or alternatively sensor(s) 840 may be used to determine characteristics of nearby vehicles and other objects as described herein.

Embodiments of the vehicle computer system 810 may also include a GNSS receiver 880 capable of receiving signals 884 from one or more GNSS satellites using an antenna 882 (which could be the same as antenna 832). Positioning based on GNSS signal measurement can be utilized to determine a current location of the vehicle and further may be used as a basis to determine the location of nearby detected objects, including other vehicles. The GNSS receiver 880 can extract a position of the vehicle computer system 810, using conventional techniques, from GNSS satellites of a GNSS system, such as Global Positioning System (GPS) and/or similar satellite systems.

The vehicle computer system 810 may further comprise and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the vehicle computer system 810 also can comprise software elements (not shown in FIG. 8), including an operating system, device drivers, executable libraries, and/or other code, such as one or more application programs, which may comprise computer programs provided by various embodiments, and/or may be designed to implement methods and/or configure systems as described herein. Software applications stored in memory 860 and executed by processing unit(s) 825 may be used to implement the application layer. Moreover, one or more procedures described with respect to the method(s) discussed herein may be implemented as code and/or instructions in memory 860 that are executable by the vehicle computer system 810 (and/or processing unit(s) 825 or DSP 820 within vehicle computer system 810), including the functions illustrated in the method 600 of FIG. 6. In an aspect, then, such code and/or instructions can be used to configure and/or adapt a general-purpose computer (or other device) to perform one or more operations in accordance with the described methods.

With reference to the appended figures, components that can include memory can include non-transitory machine-readable media. The term "machine-readable medium" and "computer-readable medium" as used herein refer to any storage medium that participates in providing data that causes a machine to operate in a specific fashion. In embodiments provided hereinabove, various machine-readable media might be involved in providing instructions/code to processing units 825 and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, RAM, a programmable ROM (PROM), erasable programmable ROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. In addition, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special-purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. In addition, a number of steps may be undertaken before, during, or after the above elements are considered. Accordingly, the above description does not limit the scope of the disclosure.

What is claimed is:

1. A method of detecting and mitigating radio frequency (RF) interference at a first vehicle, the method comprising:
   detecting one or more vehicles within a predetermined threshold distance of the first vehicle, wherein the detecting the one or more vehicles comprises:
      receiving one or more return signals from a sensor of the first vehicle, wherein the sensor comprises a radar, a LiDAR, a camera, an ultrasound sensor, or any combination thereof;
      determining a distance of the one or more vehicles based on the one or more return signals; and
      comparing the distance of the one or more vehicles to the predetermined threshold distance;
   responsive to the detecting, determining a location and a motion state of the one or more vehicles;
   determining potential RF interference of at least a portion of a wireless network of the first vehicle by the one or more vehicles based at least in part on the determined location and the determined motion state of the one or more vehicles; and
   implementing an interference mitigation technique based at least in part on the determined location, the determined motion state of the one or more vehicles, and detecting a second vehicle being within one of a first threshold distance or a second threshold distance from the first vehicle, wherein the first threshold distance is determined based on a first rate of approach of a second vehicle towards the first vehicle, and the second threshold distance is determined based on a second rate of approach of the second vehicle towards the first vehicle.

2. The method of claim 1, further comprising:
determining a velocity of the one or more vehicles based on the one or more return signals, wherein the velocity includes a speed component and a direction component; and
determining the predetermined threshold distance based at least in part on the determined velocity.

3. The method of claim 1, wherein the detecting the one or more vehicles within the predetermined threshold distance of the first vehicle comprises:
receiving at least one V2X message from a second vehicle; and
determining, from the at least one V2X message, a location, a heading, and/or a speed of the second vehicle.

4. The method of claim 3, wherein the
at least one V2X message includes a Basic Safety Message (BSM), and wherein the method further comprises:
determining, from the BSM, a wireless network configuration on the second vehicle.

5. The method of claim 4, further comprising determining a time of the potential RF interference based at least in part on the location, the heading, and the speed of the one or more vehicles.

6. The method of claim 4, further comprising determining a level of vulnerability of a portion of the wireless network of the first vehicle to the potential RF interference.

7. The method of claim 1, wherein the interference mitigation technique comprises:
changing a frequency or a channel of a wireless transmitter of the wireless network,
activating one or more additional wireless transmitters of the wireless network,
or a combination thereof.

8. A device comprising:
a memory; and
one or more processing units communicatively coupled with the memory and configured to cause the one or more processing units to:
detect one or more vehicles within a first predetermined threshold distance of a first vehicle by:
receiving one or more return signals from a sensor of the first vehicle, wherein the sensor comprises a radar, a LIDAR, a camera, an ultrasound sensor, or any combination thereof;
determining a first distance of the one or more vehicles based on the one or more return signals; and
comparing the first distance to the first predetermined threshold distance;
responsive to the detecting, determine a location and a motion state of the one or more vehicles;
determine potential radio frequency (RF) interference of at least a portion of a wireless network of the first vehicle by the one or more vehicles based at least in part on the determined location and the determined motion state of the one or more vehicles; and
implement an interference mitigation technique based at least in part on the determined location, the determined motion state of the one or more vehicles, and one of the first predetermined threshold distance or a second predetermined threshold distance.

9. The device of claim 8, wherein the one or more processing units are further configured to:
determine a velocity of the one or more vehicles based on the one or more return signals, wherein the velocity includes a speed component and a direction component; and
determine the first predetermined threshold distance based at least in part on the determined velocity.

10. The device of claim 8, wherein, to detect the one or more vehicles within the first predetermined threshold distance of the first vehicle, the one or more processing units are configured to:
receive at least one V2X message from a second vehicle; and
determine, from the at least one V2X message, a location, a heading, and/or a speed of the second vehicle.

11. The device of claim 10, wherein the at least one V2X message includes at least one of a Basic Safety Message (BSM) or a Cooperative Awareness Message (CAM), and wherein the one or more processing units are configured to:
create a local dynamic map (LDM) based on the at least one of the BSM or the CAM.

12. The device of claim 11, wherein the one or more processing units are further configured to determine a time of the potential RF interference based at least in part on the location, the heading, and the speed of the one or more vehicles.

13. The device of claim 11, wherein the one or more processing units are further configured to determine a level of vulnerability of a portion of the wireless network of the first vehicle to the potential RF interference.

14. The device of claim 8, wherein the mitigation technique comprises increasing a power of a wireless transmitter of the wireless network.

15. The device of claim 8, wherein, to implement the interference mitigation technique, the one or more processing units are further configured to:
change a frequency or a channel of a wireless transmitter of the wireless network,
increase or decrease a gain level of a wireless receiver of the wireless network, or
activate one or more additional wireless transmitters of the wireless network,
or any combination thereof.

16. A device comprising:
means for detecting one or more vehicles within a first predetermined threshold distance of a first vehicle, the means for detecting comprises:
means for receiving one or more return signals from a sensor of the first vehicle, wherein the sensor comprises a radar, a LIDAR, a camera, an ultrasound sensor, or any combination thereof;
means for determining a distance of the one or more vehicles based on the one or more return signals; and
means for determining the distance is less than the first predetermined threshold distance;
means for, responsive to the detecting, determining a location and a motion state of the one or more vehicles;
means for determining potential radio frequency (RF) interference of at least a portion of a wireless network of the first vehicle by the one or more vehicles based at least in part on the determined location and the determined motion state of the one or more vehicles; and means for implementing an interference mitigation technique based at least in part on the determined location, the determined motion state of the one or more vehicles, and one of the first predetermined threshold distance or a second predetermined threshold distance.

17. The device of claim 16, further comprising:
means for determining a velocity of the one or more vehicles based on the one or more return signals, wherein the velocity includes a speed component and a direction component; and
means for determining the first predetermined threshold distance based at least in part on the determined velocity.

18. The device of claim 16, wherein the means for detecting the one or more vehicles within the first predetermined threshold distance of the first vehicle comprises:
means for receiving at least one V2X message from a second vehicle; and
means for determining from the at least one V2X message, a location, a heading, and/or a speed of the second vehicle.

19. The device of claim 18, wherein the at least one V2X message includes a Basic Safety Message (BSM) and wherein the device further comprises:
means for determining, from the BSM, a wireless network configuration of the second vehicle.

20. The device of claim 19, further comprising means for determining a time of the potential RF interference based at least in part on the location, the heading, and the speed of the one or more vehicles.

21. The device of claim 19, further comprising means for determining a level of vulnerability of a portion of the wireless network of the first vehicle to the potential RF interference.

22. The device of claim 16, wherein the means for implementing an interference mitigation technique comprises:
means for changing a frequency or a channel of a wireless transmitter of the wireless network,
means for increasing or decreasing a gain level of a wireless receiver of the wireless network, or
means for activating one or more additional wireless transmitters of the wireless network,
or any combination thereof.

23. A non-transitory computer-readable medium having instructions stored thereby which, when executed by one or more processing units, cause the processing units to perform functions including:

detecting one or more vehicles within a first predetermined threshold distance of a first vehicle, wherein the detecting comprises:
receiving one or more return signals from a sensor of the first vehicle, wherein the sensor comprises a radar, a LIDAR, a camera, an ultrasound sensor, or any combination thereof;
determining a distance of the one or more vehicles based on the one or more return signals; and
determining the distance is less than the first predetermined threshold distance;
responsive to the detecting, determining a location and a motion state of the one or more vehicles;
determining potential radio frequency (RF) interference of at least a portion of a wireless network of the first vehicle by the one or more vehicles based at least in part on the determined location and the determined motion state of the one or more vehicles; and
implementing an interference mitigation technique based at least in part on the determined location, the determined motion state of the one or more vehicles, and one of the first predetermined threshold distance or a second predetermined threshold distance.

24. A method of detecting and mitigating radio frequency (RF) interference at a first vehicle, the method comprising:
detecting one or more vehicles are within a predetermined threshold distance of the first vehicle, wherein the detecting includes determining a first threshold distance based on a first rate of approach of the one or more vehicles towards the first vehicle, and a second threshold distance based on a second rate of approach of the one or more vehicles towards the first vehicle;
determining a location and a motion state of the one or more vehicles;
determining potential RF interference of at least a portion of a wireless network of the first vehicle based at least in part on the determined location and the motion state of the one or more vehicles; and
implementing an interference mitigation technique based at least in part on the determined location, the motion state of the one or more vehicles, and the one or more vehicles being within one of the first threshold distance or the second threshold distance from the first vehicle.

25. The method of claim 24, further comprising:
determining a velocity of the one or more vehicles based on receiving one or more return signals from a sensor of the first vehicle, wherein the velocity includes a speed component and a direction component; and
determining the predetermined threshold distance based at least in part on the determined velocity.

* * * * *